(12) United States Patent
Goto et al.

(10) Patent No.: US 8,446,382 B2
(45) Date of Patent: May 21, 2013

(54) INFORMATION PROCESSING APPARATUS AND INPUT CONTROL METHOD

(75) Inventors: Masayuki Goto, Osaka (JP); Makoto Hosoi, Osaka (JP); Yoshihiro Takamatsuya, Kawasaki (JP); Shigefumi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 12/926,689

(22) Filed: Dec. 3, 2010

(65) Prior Publication Data

US 2011/0074721 A1    Mar. 31, 2011

Related U.S. Application Data

(63) Continuation of application No. PCT/JP2008/069679, filed on Oct. 29, 2008.

(30) Foreign Application Priority Data

Jun. 4, 2008  (JP) ................................. 2008-146637
Jun. 4, 2008  (JP) ................................. 2008-146638

(51) Int. Cl.
 *G06F 3/041*   (2006.01)
(52) U.S. Cl.
 USPC ......................................... 345/173; 382/116
(58) Field of Classification Search
 USPC ......................................... 345/156, 173–181
 See application file for complete search history.

(56) References Cited

U.S. PATENT DOCUMENTS

| | | | |
|---|---|---|---|
| 7,764,274 B2 * | 7/2010 | Westerman et al. | 345/173 |
| 7,969,412 B2 * | 6/2011 | Nagiyama et al. | 345/156 |
| 2005/0041841 A1 * | 2/2005 | Yoo et al. | 382/124 |
| 2006/0215887 A1 | 9/2006 | Nishimura et al. | |
| 2007/0024597 A1 * | 2/2007 | Matsuoka | 345/173 |
| 2008/0247614 A1 * | 10/2008 | Abiko | 382/124 |
| 2008/0267465 A1 | 10/2008 | Matsuo et al. | |
| 2009/0009488 A1 * | 1/2009 | D'Souza et al. | 345/177 |
| 2009/0207130 A1 * | 8/2009 | Chen et al. | 345/156 |
| 2009/0232367 A1 * | 9/2009 | Shinzaki | 382/124 |

FOREIGN PATENT DOCUMENTS

| | | |
|---|---|---|
| JP | 2001-265507 | 9/2001 |
| JP | 2006-186837 | 7/2006 |
| JP | 2006-260054 | 9/2006 |
| JP | 2007-94960 | 4/2007 |

(Continued)

OTHER PUBLICATIONS

International Search Report for PCT/JP2008/069679, mailed on Dec. 9, 2008.

(Continued)

*Primary Examiner* — Duc Dinh
(74) *Attorney, Agent, or Firm* — Staas & Halsey LLP

(57) ABSTRACT

An information processing apparatus includes a fingerprint sensor that detects movement of a finger, and a transforming unit that transforms the movement of the finger detected by the fingerprint sensor into an input event corresponding to an operational instruction to an application that runs on the information processing apparatus. When an amount of movement of the finger detected by the fingerprint sensor is greater than a threshold for the amount of movement, the transforming unit inhibits transformation of the movement of the finger detected by the fingerprint sensor into the input event.

4 Claims, 11 Drawing Sheets

FOREIGN PATENT DOCUMENTS

| | | |
|---|---|---|
| JP | 2007-122522 | 5/2007 |
| JP | 2007-189395 | 7/2007 |
| JP | 2007-264958 | 10/2007 |
| JP | 2008-21320 | 1/2008 |
| WO | 2005/106639 A1 | 11/2005 |

OTHER PUBLICATIONS

Japanese Office Action for related Japanese Patent Application No. 2010-515730, mailed on Jan. 15, 2013.

* cited by examiner

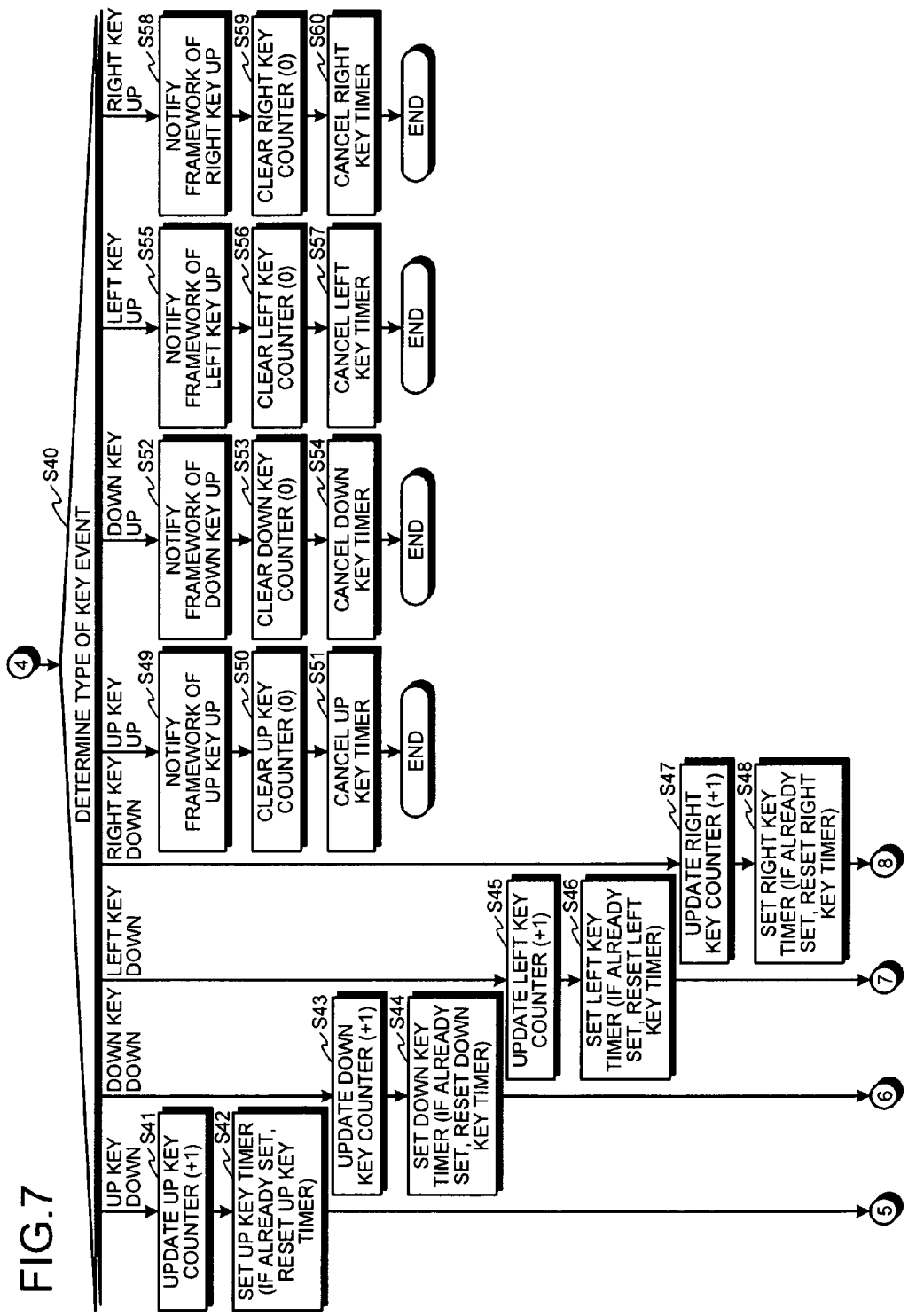

4 FINGERPRINT SENSOR
20 FINGER

FIRST IMAGE: ~31a
SECOND IMAGE: ~31b
~31c

FIG.11A
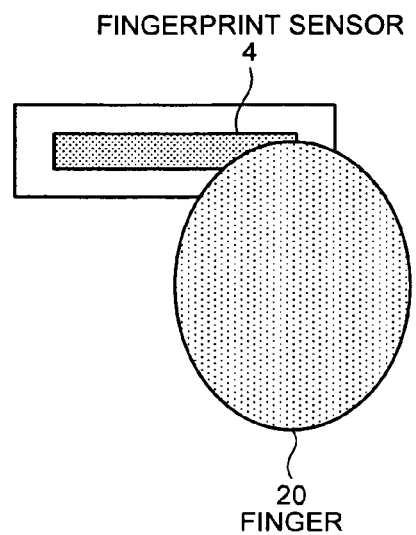
FINGERPRINT SENSOR
4
20
FINGER
FIG.11B
FIRST IMAGE:  ~32a
SECOND IMAGE:  ~32b
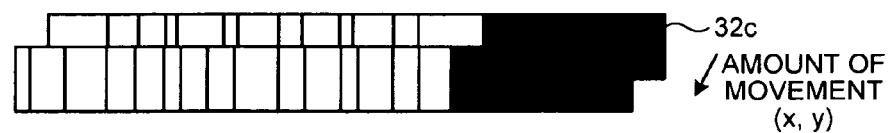 ~32c
AMOUNT OF
MOVEMENT
(x, y)

INFORMATION PROCESSING APPARATUS AND INPUT CONTROL METHOD

CROSS-REFERENCE TO RELATED APPLICATION(S)

This application is a continuation of International Application No. PCT/JP2008/069679, filed on Oct. 29, 2008 which claims the benefit of priority from Japanese Patent Application No. 2008-146637, filed on Jun. 4, 2008 and Japanese Patent Application 2008-146638, filed on Jun. 4, 2008, the entire contents of which are incorporated herein by reference.

FIELD

The embodiment discussed herein is directed to an information processing apparatus and an input control method using a fingerprint sensor.

BACKGROUND

In recent years, mobile phones have been widely used. Early mobile phones have been mainly in the form of a vertically long plate; however, recently, in order to reduce the length of a mobile phone for increasing the portability, a folding mobile phone is becoming mainstream, of which casing is divided into an upper casing and a lower casing overlapping each other so that the casing can be folded and unfolded with respect to a rotary shaft mounted on one side of the upper and the lower casings.

Furthermore, Japanese Laid-open Patent Publication No. 2001-265507 discloses a mobile terminal device operable by a jog dial. The mobile terminal device has a fingerprint authentication function integrated with the jog dial, and restricts or allows a terminal operation function using the jog dial depending on a result of fingerprint matching.

Recently, a device that can perform fingerprint authentication and a pointing operation by using a fingerprint sensor device mounted on a mobile terminal or the like is increasing.

The pointing operation normally tends to be activated in any situations.

Although it depends on where the fingerprint sensor is mounted, there is often the case that the fingerprint sensor is unintentionally touched with a finger because of the way of carrying or holding the mobile terminal independently of operations. When the finger-touch is performed unintentionally (even when it is light touch), the fingerprint sensor senses the contact of the finger and outputs operational information.

In the case of the unintentional contact, there is a tendency that the grounding to a sensor unit of the fingerprint sensor becomes unstable and feature data of the finger significantly varies, so that a malfunction or a false operation continuously occurs in a higher-level application (e.g., full browser), which is a problem.

SUMMARY

According to an aspect of an embodiment of the invention, an information processing apparatus includes a fingerprint sensor that detects movement of a finger, and a transforming unit that transforms the movement of the finger detected by the fingerprint sensor into an input event corresponding to an operational instruction to an application that runs on the information processing apparatus, wherein when an amount of movement of the finger detected by the fingerprint sensor is greater than a threshold for the amount of movement, the transforming unit inhibits transformation of the movement of the finger detected by the fingerprint sensor into the input event.

According to another aspect of an embodiment of the invention, an input control method implemented by an information processing apparatus includes detecting, by a fingerprint sensor, movement of a finger, and transforming the movement of the finger detected at the detecting into an input event corresponding to an operational instruction to an application that runs on the information processing apparatus, wherein the transforming includes, when an amount of movement of the finger detected by the fingerprint sensor is greater than a threshold for the amount of movement, inhibiting transformation of the movement of the finger detected by the fingerprint sensor into the input event.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a flowchart of a fourth process among the processes performed using the operation input function of the mobile phone illustrated in FIG. 2;

FIG. 11A is a diagram illustrating a situation in which a person unintentionally touches the fingerprint sensor;

FIG. 11B is a diagram illustrating an example of an image obtained by the fingerprint sensor in the situation illustrated in FIG. 11A.

DESCRIPTION OF EMBODIMENT(S)

According to one aspect of an embodiment of the present invention, a fingerprint device capable of detecting a fingerprint of a finger and movement of the finger is mounted as an input device on a mobile terminal or the like.

The fingerprint device is characterized in that it has a fingerprint authentication function using finger sliding and a pointing operation function following the movement of a finger (upward, downward, leftward, rightward, or at an angle).

The fingerprint authentication on a finger is implemented by using the conventional technology. The movement of a finger for performing the pointing operation adds an extension function to a device system and implements functions for tuning, double tap, and a drag mode based on the user's operability, so that comfortable usability can be achieved, which is an advantage.

Preferred embodiments of the present invention will be explained with reference to the drawings.

Overall Configuration

Figure 1A:
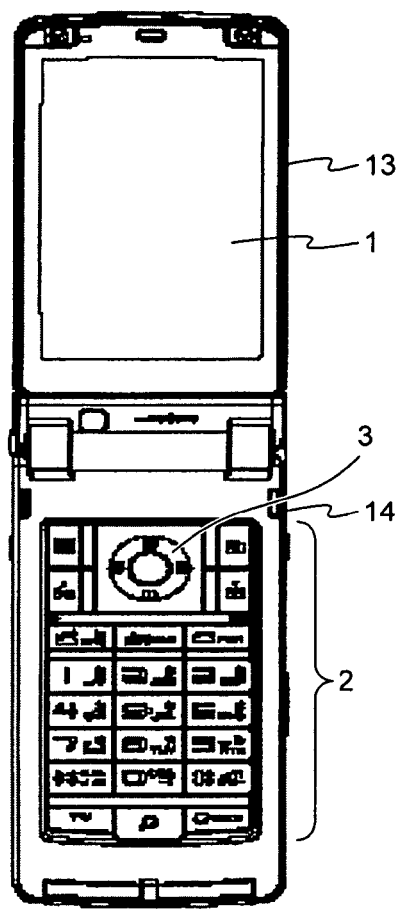
FIGS. 1A and 1B are diagrams illustrating a configuration of a mobile phone according to an embodiment.
Figure 1B:
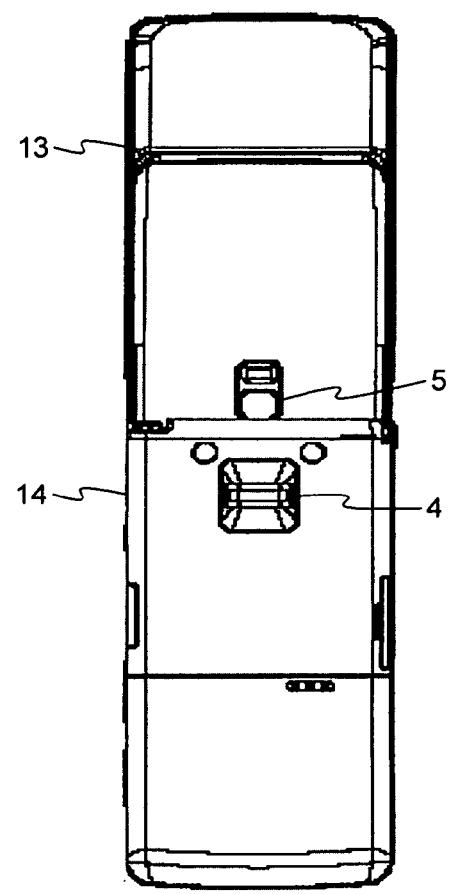

FIGS. 1A and 1B are diagrams illustrating a configuration of a mobile phone according to an embodiment.

Figure 4:
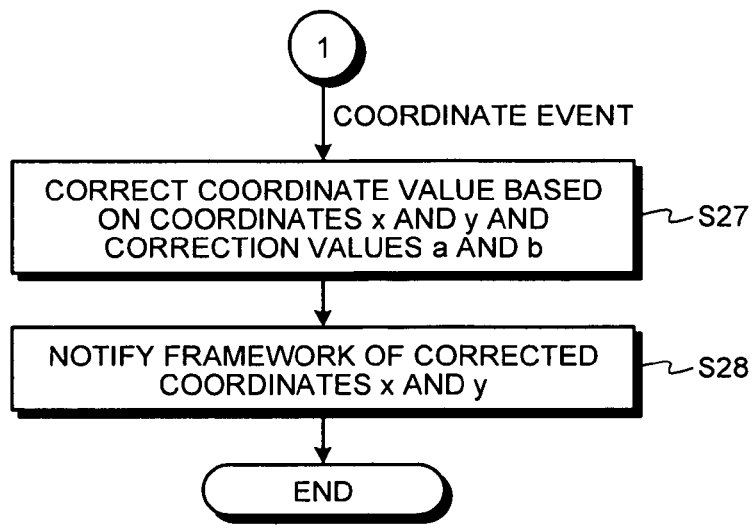
FIG. 4 is a flowchart of a first process among the processes performed using the operation input function of the mobile phone illustrated in FIG. 2.

In FIG. 1A, 1 denotes a display, 2 denotes an operation key, and 3 denotes a multi-cursor key. In FIG. 1B, 4 denotes a fingerprint sensor and 5 denotes a camera.

The mobile phone is a folding type formed of an upper casing 13 and a lower casing 14. When the mobile phone is unfolded, there are a front side equipped with the display 1, the operation key 2, and the multi-cursor key 3 and a back side equipped with the fingerprint sensor 4 and the camera 5. The upper casing 13 houses the display 1 on the front side and houses the camera 5 on the back side. The lower casing 14 houses the operation key 2 and the multi-cursor key 3 on the front side and houses the fingerprint sensor 4 on the back side. As can be seen in FIG. 1B, the fingerprint sensor 4 is smaller in size than the display 1, and has a size of about 10 mm in the longitudinal direction.

Malfunction Due to Unintentional Contact

A malfunction that occurs when the fingerprint sensor 4 is unintentionally touched with a finger is explained below. The mobile phone according to the embodiment performs pattern matching on images of fingerprints obtained by the fingerprint sensor 4 per 8 ms, and thereby detects the direction and the amount of movement of a finger. The speed that a human finger moves is about 20 cm/s at the maximum. Therefore, even when images are obtained by the fingerprint sensor 4 of about 10 mm in the longitudinal direction, because the images are obtained at intervals of 8 ms, portions where fingerprint patterns match each other are contained in the images. When the portions where the fingerprint patterns match each other are detected, it is possible to obtain the direction and the amount that the finger moves while these images are obtained.

Figure 10A:
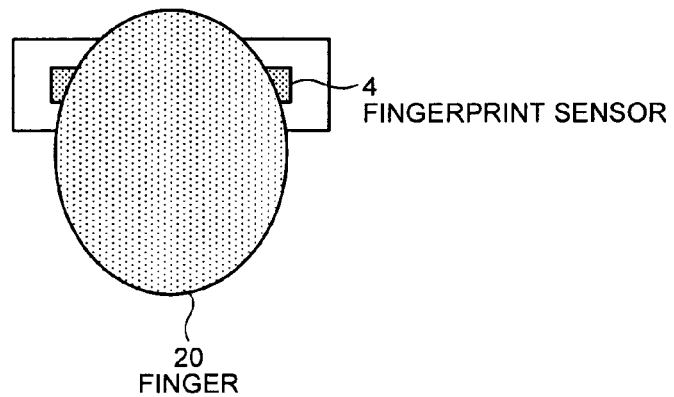
FIG. 10A is a diagram illustrating a situation in which a person intentionally touches a fingerprint sensor for an operation.
Figure 10B:
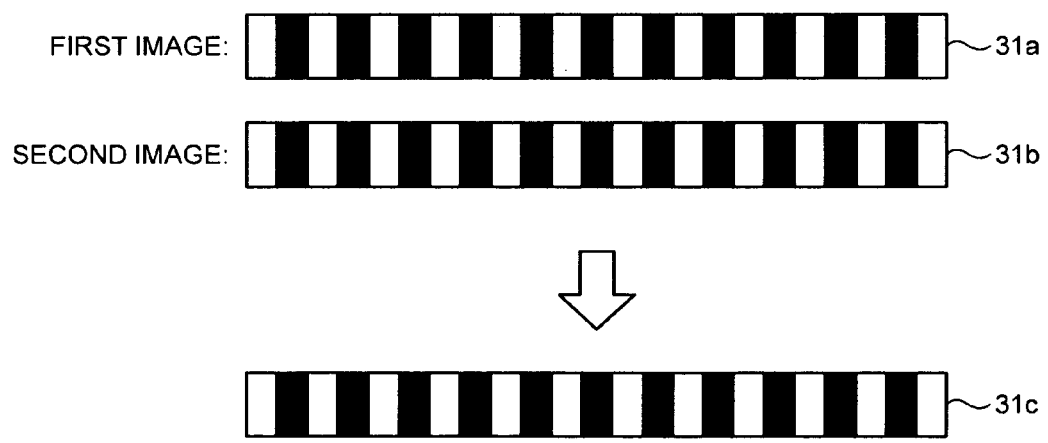
FIG. 10B is a diagram illustrating an example of an image obtained by the fingerprint sensor in the situation illustrated in FIG. 10A.

FIG. 10A is a diagram illustrating a situation in which a person intentionally touches the fingerprint sensor 4 for an operation. As illustrated in FIG. 10A, when the person intentionally touches the fingerprint sensor 4, a finger 20 is placed at a position where the whole fingerprint sensor 4 is covered. When the finger 20 is stood still, an image 31a and an image 31b as illustrated in FIG. 10B are successively obtained. In the image 31a and the image 31b, fingerprint patterns appear in almost all areas.

When pattern matching is performed between the image 31a and the image 31b and then the images are combined so that the portions where the fingerprint patterns match each other overlap each other, an image 31c is obtained. Because the finger 20 has been stood still, the image 31c becomes such that the image 31b entirely overlaps the image 31a. In this case, movement of the finger 20 is not detected.

FIG. 11A is a diagram illustrating a situation in which a person unintentionally touches the fingerprint sensor 4. As illustrated in FIG. 11A, when the person unintentionally touches the fingerprint sensor 4, the finger 20 may be placed at a corner position, such as a right edge, of the fingerprint sensor 4. When the finger 20 is stood still, an image 32a and an image 32b as illustrated in FIG. 11B are successively obtained.

The definition of an image of a fingerprint input to the fingerprint sensor 4 differs depending on the pressing force of the finger or the degree of moistness. Therefore, the fingerprint sensor 4 adjusts the level of a detected signal by AGC (Automatic Gain Control) so that the definition of the fingerprint in an output image can be uniform. Consequently, when the finger 20 is placed on the right edge of the fingerprint sensor 4, the detected signal is excessively amplified so that an image corresponding to the fingerprint can be obtained even in a portion where the finger 20 is not placed.

As a result, in the image 32a and the image 32b, portions at the right edges where images of the fingerprint are expected to appear under normal conditions are darkened, and noise appears in other portions due to the amplification. Because the noise occurs randomly, respective noise portions of the image 32a and the image 32b become different pattern images.

When pattern matching is performed between the image 32a and the image 32b and then the images are combined so that the portions where the fingerprint patterns match each other overlap each other, an image 32c is obtained. Because the respective noise portions of the image 32a and the image 32b have different patterns, the image 32a and the image 32b do not completely overlap each other in the image 32c, so that the movement of the finger 20 is erroneously detected.

In this manner, when the finger 20 touches the edge of the fingerprint sensor 4, the signal is excessively amplified by AGC, so that the movement of the finger 20 is erroneously detected, resulting in causing a malfunction of the mobile phone. In the above explanation, it is explained that the finger does not move. Even when the finger 20 moves at the edge of the fingerprint sensor 4, movement different from the actual movement may be erroneously detected by the action of AGC, so that a malfunction occurs in the mobile phone.

To prevent such a malfunction, the mobile phone according to the embodiment performs threshold processing on the detected movement of the finger 20. Specifically, when the amount of movement of the finger detected by the fingerprint sensor 4 exceeds a threshold corresponding to the maximum value of the amount of movement that a human finger can move, the mobile phone according to the embodiment discards the detection result.

In this manner, by performing the threshold determination related to the amount of movement, even when erroneous detection is performed due to the action of AGC, the detection result that may not be detected by normal movement of the finger is ignored, so that the malfunction can be prevented.

Figure 12:
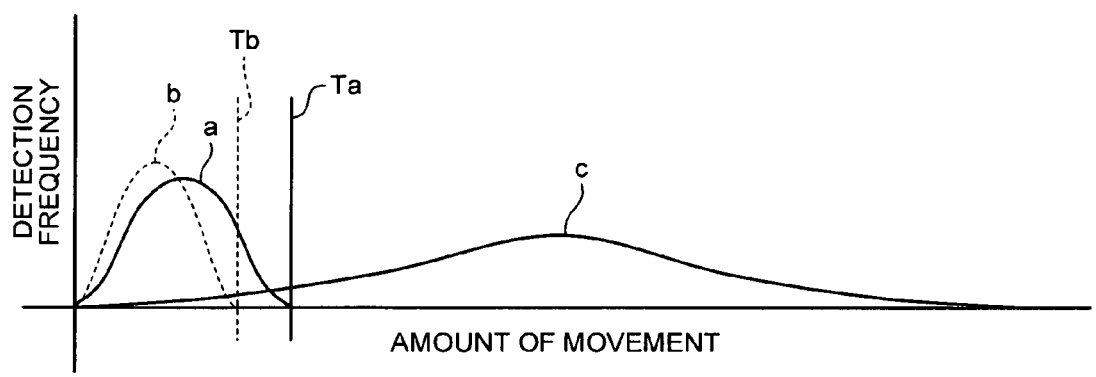
FIG. 12 is a diagram for explaining threshold processing related to the amount of movement.

The threshold used for the threshold processing related to the amount of movement is explained below with reference to FIG. 12. In FIG. 12, a curve a represents a distribution of the detection frequency of the amount of movement of a finger detected by the fingerprint sensor 4 when a person intentionally performs an operation. Furthermore, a curve c represents a distribution of the detection frequency of the amount of movement of a finger detected by the fingerprint sensor 4 when a person unintentionally touches the edge of the fingerprint sensor 4.

As illustrated in FIG. 12, although the curve a and the curve c partially overlap each other, the curve c is broader than the curve a. This is because the amount of movement erroneously detected by the action of AGC sometimes becomes greater than the amount of movement that a human finger can move. Therefore, by setting an upper limit Ta of the amount of movement of the curve a as the threshold, it is possible to discard only the amount of movement erroneously detected by the action of AGC without discarding the amount of movement detected when a person intentionally performs an operation.

Ta may be calculated in advance based on the maximum value (about 20 cm/s) of the amount of movement that a human finger can move and the interval for detecting the movement of the finger, or may be determined for each user by multiplying the maximum value of the amount of movement that is obtained by instructing the user to perform operations of the fingerprint sensor 4 a predetermined number of times by an allowance rate (a coefficient equal to or greater than 1).

Furthermore, it is possible to take into account change in the moving direction of the finger in the threshold processing. A curve b in FIG. 12 represents a distribution of the detection frequency of the amount of movement of a finger detected by the fingerprint sensor 4 along with the change in the moving direction of the finger when a person intentionally performs an operation. As illustrated in FIG. 12, when the person changes the direction of the finger, the amount of movement of the finger decreases by the amount of change, so that the curve b is narrowed. Therefore, when the change in the moving direction of the finger is detected by the fingerprint sensor 4, the probability of discarding the amount of movement erroneously detected by the action of AGC can be improved by setting an upper limit value Tb of the amount of movement represented by the curve b as the threshold.

Furthermore, when the amount of movement is discarded more than a predetermined number of times, i.e., when the erroneous detection due to the action of AGC is performed more than a predetermined number of times, it is assumed that the state is continued in which a person unintentionally touches the edge of the fingerprint sensor 4, and therefore, all of the detection results of the fingerprint sensor 4 are ignored until a predetermined operation is detected. The predetermined operation is, for example, an operation of releasing the finger from the fingerprint sensor 4 and then retouching the fingerprint sensor 4.

In this manner, because the threshold determination related to the number of times of detection is performed, even when the detected amount of movement is in a range in which it is difficult to distinguish whether the amount of movement is caused by the action of AGC or by the normal movement of the finger, the erroneous detection due to the action of AGC can be distinguished, so that the malfunction can be prevented.

Operation Input Function

Figure 2:
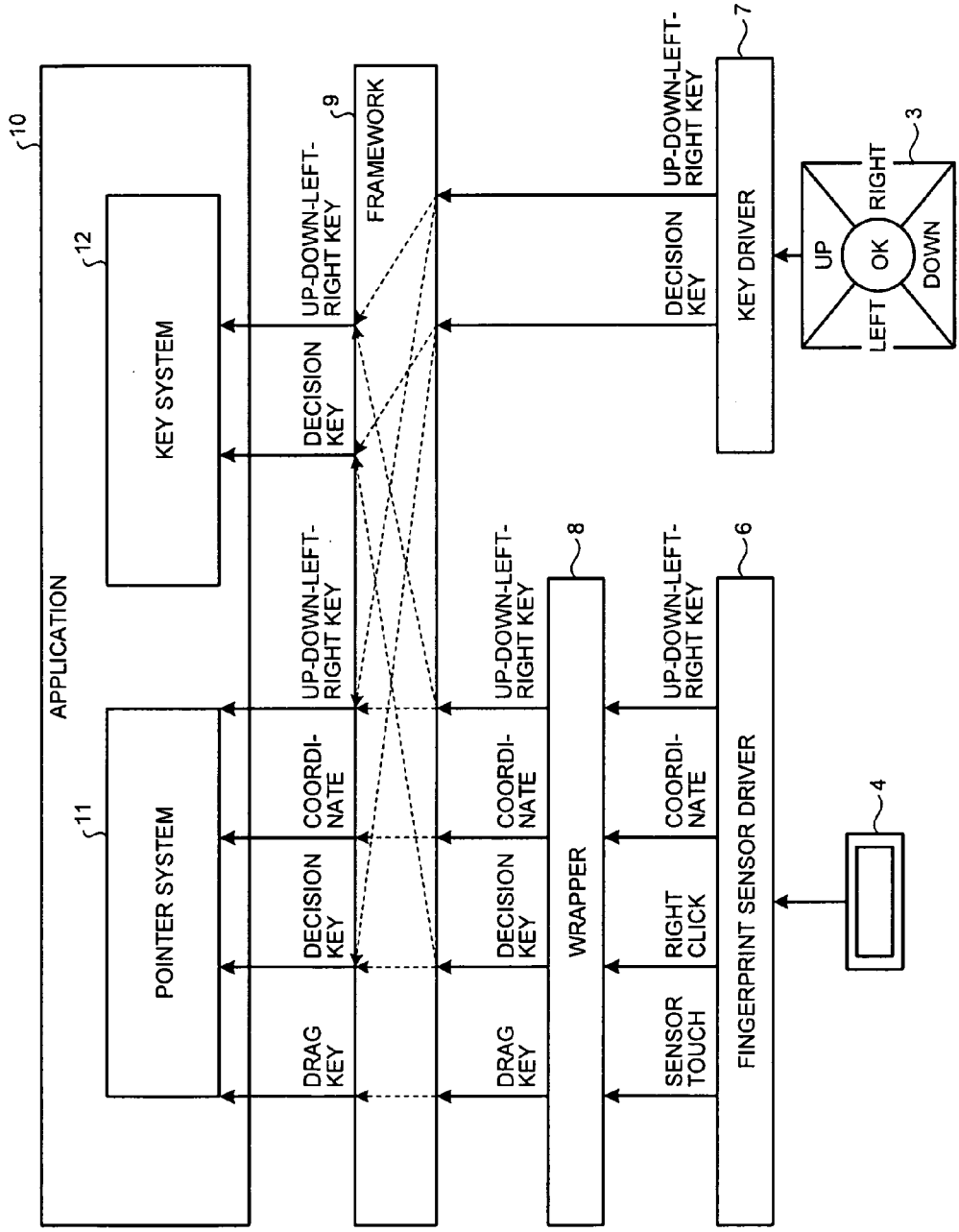
FIG. 2 is a block diagram illustrating an operation input function of the mobile phone.

FIG. 2 is a block diagram illustrating an operation input function of the mobile phone. 3 denotes the multi-cursor key, 4 denotes the fingerprint sensor, 6 denotes a fingerprint sensor driver, 7 denotes a key driver, 8 denotes a wrapper, 9 denotes a framework, 10 denotes an application, 11 denotes a pointer system application, and 12 denotes a key system application. The fingerprint sensor driver 6 determines the movement of a finger based on image information on the finger detected by the fingerprint sensor 4, and sends a notice of various types of events. The events come in various types such as an up-down-left-right key, a coordinate, right click, and sensor touch. The up-down-left-right key is an event that occurs when the fingerprint sensor 4 is traced and in which the tracing direction and the amount of movement are transformed into upward, downward, leftward, or rightward movement. The coordinate is an event that occurs when the fingerprint sensor 4 is traced and in which the tracing direction and the amount of movement are transformed into a relative coordinate (moving coordinate). The right click is an event indicating that the fingerprint sensor 4 is tapped. The sensor touch is an event indicating that the fingerprint sensor 4 is touched with a finger and a finger is released from the fingerprint sensor 4.

When the up-down-left-right key or a decision (OK) key of the multi-cursor key 3 is pressed, the key driver 7 notifies the framework 9 of an event indicating the pressed key.

The wrapper 8 performs correction on the coordinate event and the up-down-left-right key event notified by the fingerprint sensor driver 6 so that an operation can be performed without causing discomfort, and notifies the framework 9 of the event. The wrapper 8 transforms the right click event and the sensor touch event notified by the fingerprint sensor driver 6 into events for the application 10. When a finger is placed on the fingerprint sensor 4 and the finger is not moved for a predetermined period of time, i.e., when the coordinate event is not changed, from among the sensor touch event and the coordinate event notified by the fingerprint sensor driver 6, the wrapper 8 notifies the framework 9 of an event for a drag mode.

The framework 9 notifies the application 10 of the events notified by the wrapper 8 and the key driver 7. Furthermore, for an event to be notified, the framework 9 selects and sets a finger pointer from among "1" activate all functions, "2" activate full browser/i-application, and "3" inactivate by a pull-down system on a finger pointer setting screen, so that when selecting and setting "2", the framework 9 can limit an application to be notified, and when selecting and setting "3", the framework 9 can set the inactivation with which a notice is not to be sent.

The pointer system 11 in the application 10 operates based on the up-down-left-right key event, the coordinate event, the decision key event, or the drag key event obtained from the framework 9. The key system 12 in the application 10 operates based on the up-down-left-right key event and the decision key event obtained from the framework 9.

Figure 3:
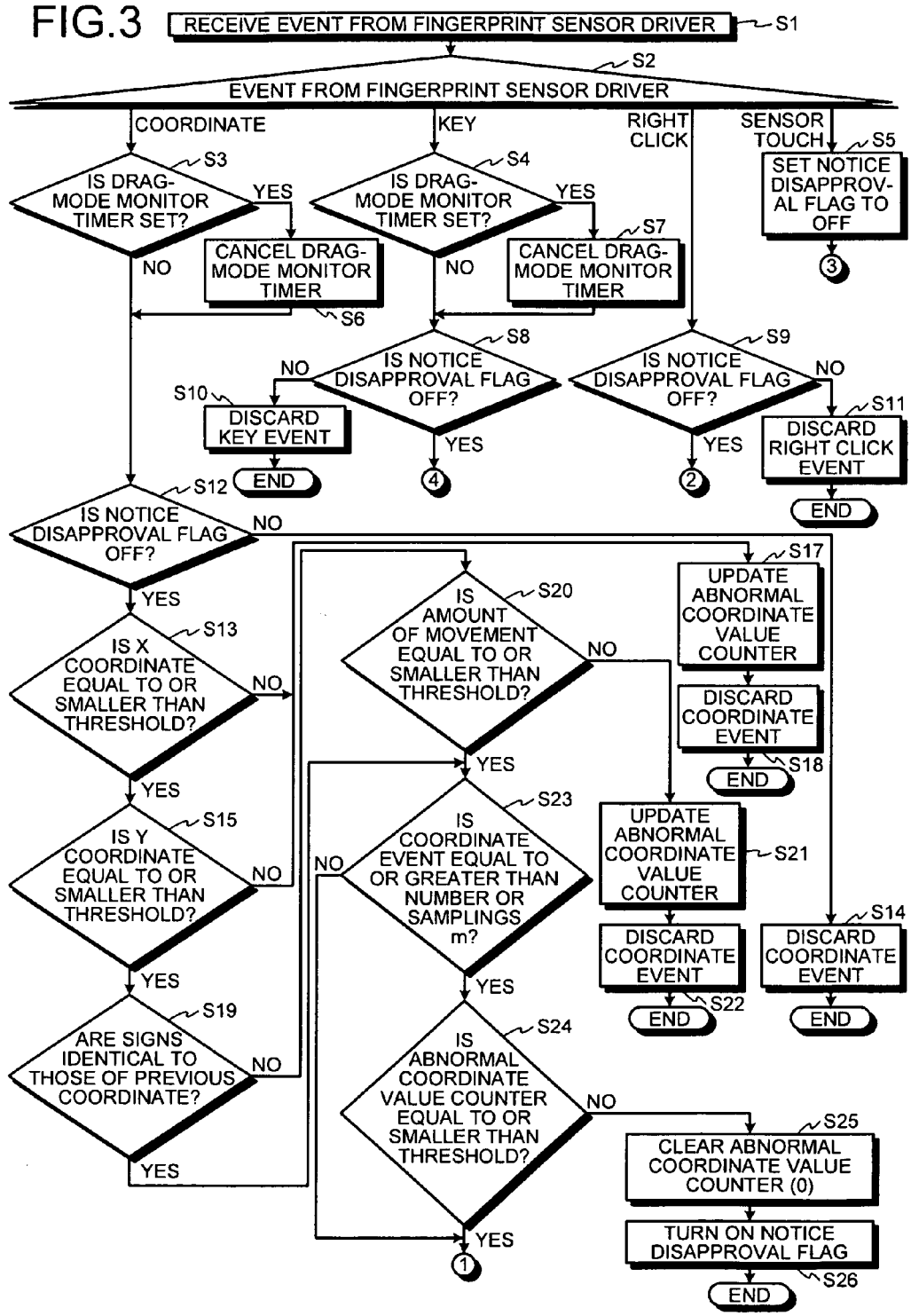
FIG. 3 is a flowchart of processes performed using the operation input function of the mobile phone illustrated in FIG. 2.

FIG. 3 is a flowchart of processes performed using the operation input function of the mobile phone illustrated in FIG. 2. Referring to FIGS. 2 and 3, an event is received from the fingerprint sensor driver 6 at S1. Subsequently, at S2, the following operation is performed on each event received from the fingerprint sensor driver 6. That is, at S2, when the coordinate event is received, the process proceeds to S3, when the key event is received, the process proceeds to S4, when the right click event is received, the process proceeds to S9, and when the sensor touch event is received, the process proceeds to S5.

At S3 for the coordinate event, it is determined whether a drag-mode monitor timer is set. When the timer is not set, the process proceeds to S12. When the timer is set, the drag-mode monitor timer is cancelled at S6.

At S12, it is determined whether a notice disapproval flag is OFF. When the flag is OFF, the process proceeds to S13. When the flag is ON, i.e., when a malfunction is recognized, the coordinate event is discarded and no notice is sent to the framework 9 at S14. At S13, it is determined whether the X coordinate of the coordinate event is equal to or smaller than a threshold. When the X coordinate is equal to or smaller than the threshold, the process proceeds to S15. When the X coordinate exceeds the threshold, the process proceeds to S17 at which the coordinate event is assumed to be invalid and an abnormal coordinate value counter is updated. Then, at S18, the coordinate event is discarded and no notice is sent to the framework 9.

At S15, it is determined whether the Y coordinate of the coordinate event is equal to or smaller than a threshold. When the Y coordinate is equal to or smaller than the threshold, the process proceeds to S19. When the Y coordinate exceeds the threshold, the process proceeds to S17 at which the coordinate event is assumed to be invalid and the abnormal coordinate value counter is updated. Then, at S18, the coordinate event is discarded and no notice is sent to the framework 9.

At S19, the coordinate event (X and Y coordinates) is compared with a previous coordinate event (X and Y coordinates). When signs of the X axis and the Y axis of the coordinate event are identical to those of the previous coordinate event, the process proceeds to S23. When one of the signs of the X axis and the Y axis is inverted between the coordinate events, the process proceeds to S20. At S20, the amount of movement of the axis of which sign is inverted (a difference between the axes) is calculated. When the calculated amount of movement is equal to or smaller than a threshold, the process proceeds to S23. When the calculated amount of movement exceeds the threshold, the coordinate event is assumed to be invalid and the abnormal coordinate value counter is updated at S21. Then, at S22, the coordinate event is discarded and no notice is sent to the framework 9.

At S23, when the number of times of receiving the coordinate event is equal to or greater than the number of samplings m, the process proceeds to S24. When the number of times of receiving the coordinate event is smaller than m, the process proceeds to a first process.

At S24, when the abnormal coordinate value counter is equal to or smaller than a threshold, the process proceeds to the first process. When the abnormal coordinate value counter exceeds the threshold, the abnormal coordinate value counter is cleared (0) at S25, and the notice disapproval flag is turned "ON" at S26.

At S4 for the key event, it is determined whether the drag-mode monitor timer is set. When the timer is not set, the process proceeds to S8. When the timer is set, the drag-mode monitor timer is cancelled at S7.

At S8, it is determined whether the notice disapproval flag is OFF. When the flag is OFF, the process proceeds to a fourth process. When the flag is ON, i.e., when a malfunction is recognized, the key event is discarded and no notice is sent to the framework 9 at S10.

At S9 for the right click event, it is determined whether the notice disapproval flag is OFF. When the flag is OFF, the process proceeds to a second process. When the flag is ON, i.e., when a malfunction is recognized, the right click event is discarded and no notice is sent to the framework 9 at S11.

At S5 for the sensor touch event, the notice disapproval flag is set to OFF, and the process proceeds to a third process.

FIG. 4 is a flowchart of the first process among the processes performed using the operation input function of the mobile phone illustrated in FIG. 2.

At S27, a corrected coordinate X is calculated by a calculation formula, i.e., corrected coordinate X=notified X coordinate×correction value a/correction value b, based on the X coordinate of the coordinate event and the correction values a and b. Furthermore, a corrected coordinate Y is calculated by a calculation formula, i.e., corrected coordinate Y=notified Y coordinate×correction value a/correction value b, based on the Y coordinate of the coordinate event and the correction values a and b.

At S28, the coordinate event with the corrected coordinates X and Y calculated at S27 is notified to the framework 9.

Figure 5:
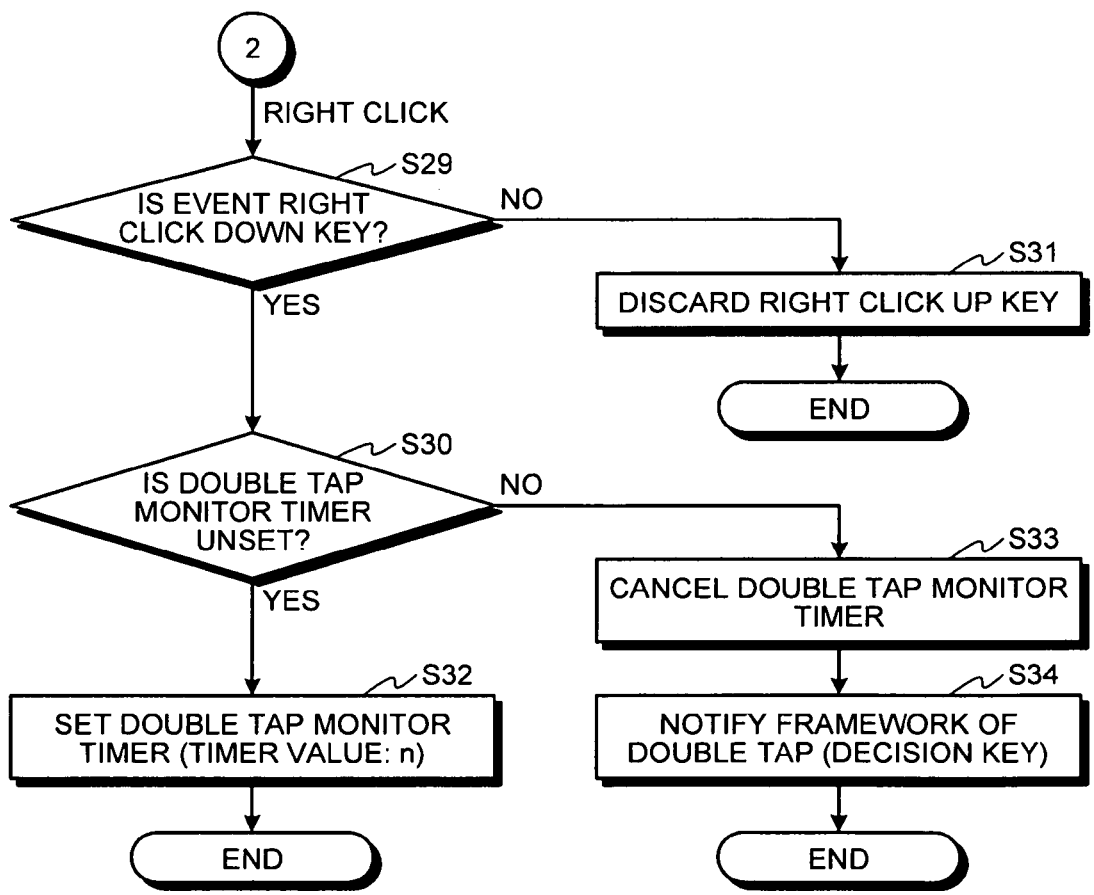
FIG. 5 is a flowchart of a second process among the processes performed using the operation input function of the mobile phone illustrated in FIG. 2.

FIG. 5 is a flowchart of the second process among the processes performed using the operation input function of the mobile phone illustrated in FIG. 2.

At S29, when the right click event is a right click down key (indicating that a finger touches the fingerprint sensor 4), the process proceeds to S30. When the right click event is a right click up key (indicating that a finger touches the fingerprint sensor 4 and is immediately released from the fingerprint sensor 4), the process proceeds to S31 at which the right click up key is discarded because this is an unnecessary right click event, and no notice is sent to the framework 9. At S30, assuming that a situation where events are notified twice by the right click in a predetermined period of time is referred to as a double tap, when a double tap monitor timer is not set, the process proceeds to S32. When the double tap monitor timer is set, the process proceeds to S33.

At S32, it is determined as the first right click, and the double tap monitor timer is set to perform double tap monitoring.

When the double tap monitor timer is timed out, no operation is performed (the fact that the first right click is present is forgotten). At S33, it is determined as the second right click, so that the double tap monitor timer is cancelled and the double tap (decision key) is notified to the framework 9 at S34.

Figure 6:
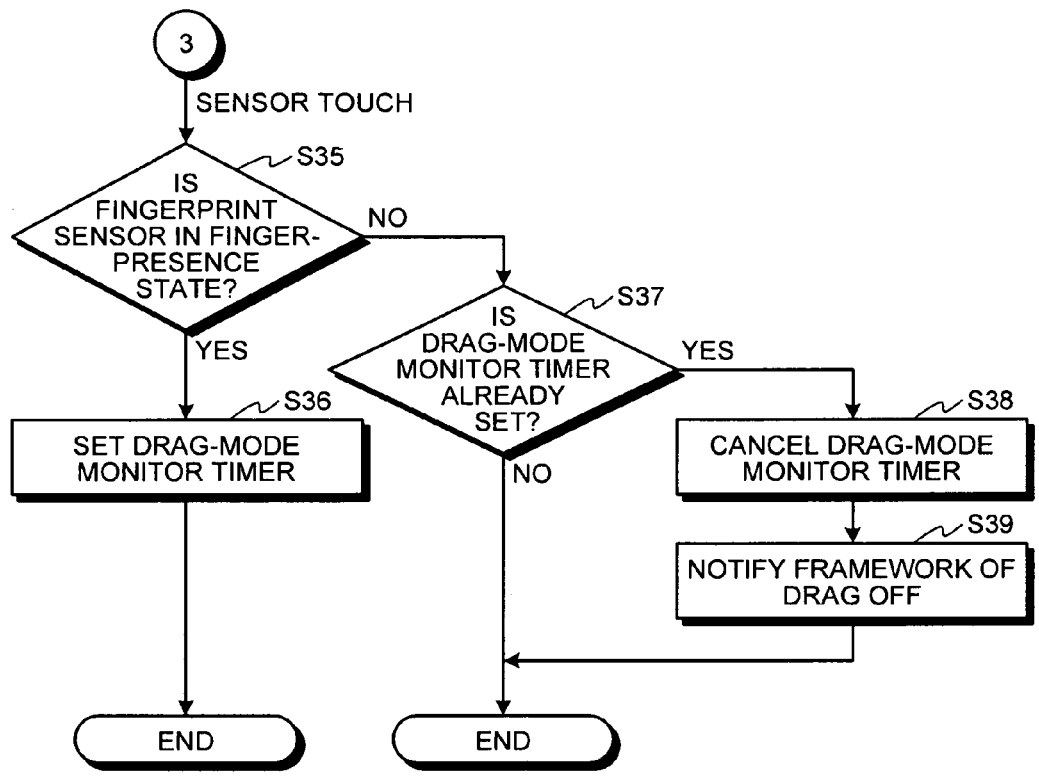
FIG. 6 is a flowchart of a third process among the processes performed using the operation input function of the mobile phone illustrated in FIG. 2.

FIG. 6 is a flowchart of the third process among the processes performed using the operation input function of the mobile phone illustrated in FIG. 2.

At S35, when the sensor touch event is not in a finger-presence state (the state in which the finger touches the fingerprint sensor), the process proceeds to S37. When the sensor touch event is in the finger-presence state (the state in which the finger touches the fingerprint sensor), the drag-mode monitor timer is set at S36.

When the drag-mode monitor timer is timed out, the drag ON (start of drag) is notified to the framework 9.

At S37, when the drag-mode monitor timer is not already set, the process ends. When the drag-mode monitor timer is already set, the drag-mode monitor timer is cancelled at S38, and drag OFF (end of drag) is notified to the framework 9 at S39.

FIG. 7 is a flowchart of the fourth process among the processes performed using the operation input function of the mobile phone illustrated in FIG. 2.

At S40, the type of the key event is determined. When the type is up key down, the process proceeds to S41, when the type is down key down, the process proceeds to S43, when the type is left key down, the process proceeds to S45, when the type is right key down, the process proceeds to S47, when the type is up key up, the process proceeds to S49, when the type is down key up, the process proceeds to S52, when the type is left key up, the process proceeds to S55, and when the type is right key up, the process proceeds to S58.

At S41, to monitor the number of notices of the up key events, an up key counter is updated (+1). At S42, to monitor that the up key events are continuously notified in a predetermined period of time, an up key timer is set. When the up key timer is already set, the timer is reset, and the process proceeds to a fifth process.

When the up key timer is timed out, the up key counter is cleared (0).

At S43, to monitor the number of notices of the down key events, a down key counter is updated (+1). At S44, to monitor that the down key events are continuously notified in a predetermined period of time, a down key timer is set. When the down key timer is already set, the timer is reset, and the process proceeds to a sixth process.

When the down key timer is timed out, the down key counter is cleared (0).

At S45, to monitor the number of notices of the left key events, a left key counter is updated (+1). At S46, to monitor that the left key events are continuously notified in a predetermined period of time, a left key timer is set. When the left key timer is already set, the timer is reset, and the process proceeds to a seventh process.

When the left key timer is timed out, the left key counter is cleared (0).

At S47, to monitor the number of notices of the right key events, a right key counter is updated (+1). At S48, to monitor that the right key events are continuously notified in a predetermined period of time, a right key timer is set. When the right key timer is already set, the timer is reset, and the process proceeds to an eighth process.

When the right key timer is timed out, the right key counter is cleared (0).

At S49, the up key up is notified to the framework 9. At S50, the up key counter is cleared (0). At S51, the up key timer is cancelled.

At S52, the down key up is notified to the framework 9. At S53, the down key counter is cleared (0). At S54, the down key timer is cancelled.

At S55, the left key up is notified to the framework 9. At S56, the left key counter is cleared (0). At S57, the left key timer is cancelled.

At S58, the right key up is notified to the framework 9. At S59, the right key counter is cleared (0). At S60, the right key timer is cancelled.

FIGS. 8A to 8D are flowcharts of the fifth to the eighth processes continued from the fourth process performed using the operation input function of the mobile phone as illustrated in FIG. 7

Figures 8A, 8B, 8C, 8D:
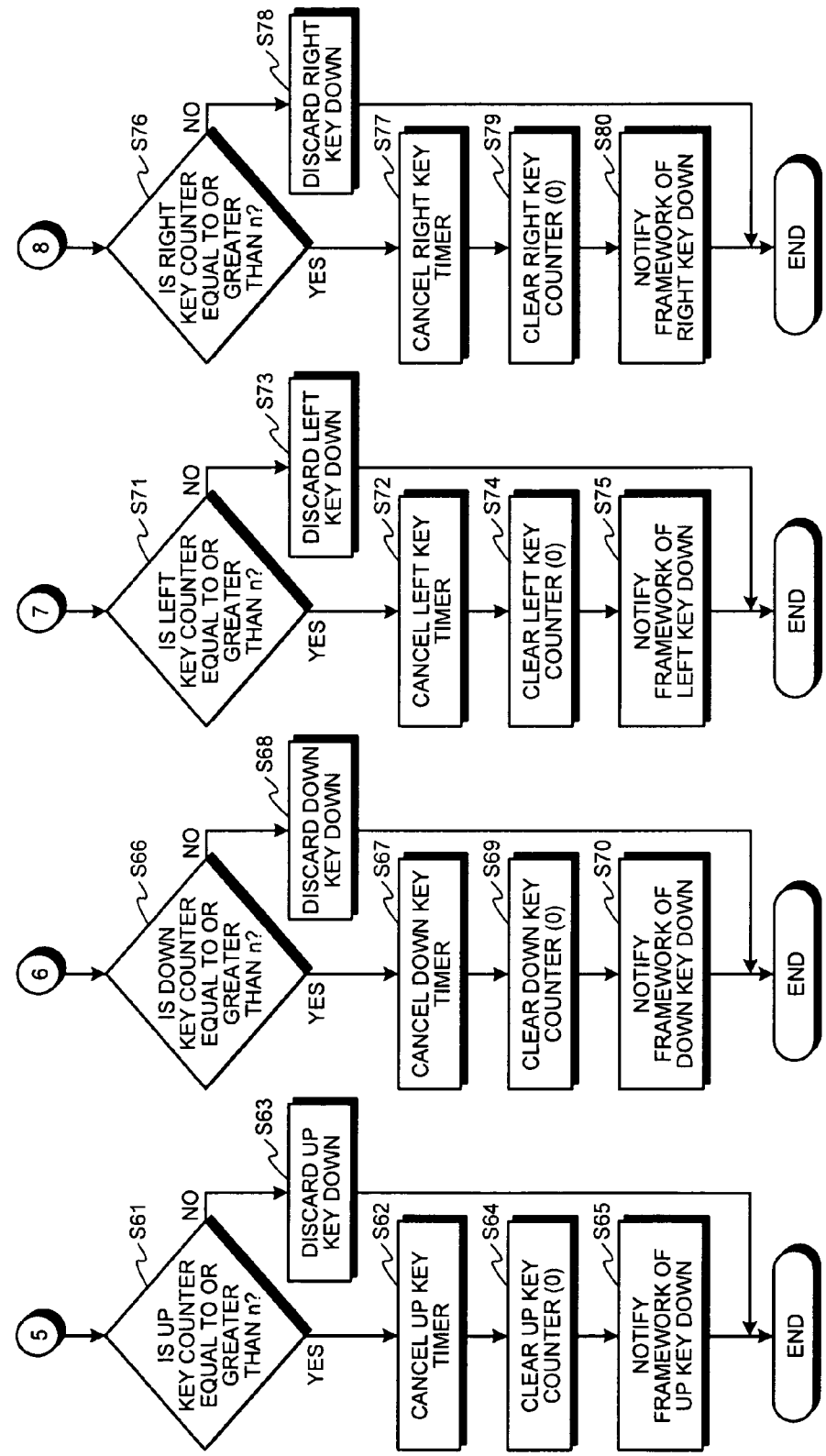
FIGS. 8A to 8D are flowcharts of fifth to eighth processes continued from the fourth process performed using the operation input function of the mobile phone illustrated in FIG. 7.

FIG. 8A is a flowchart of the fifth process continued from the fourth process performed using the operation input function of the mobile phone illustrated in FIG. 7.

At S61, when the up key counter is equal to or greater than n, the process proceeds to S62. When the up key counter is smaller than n, the process proceeds to S63 at which the up key event is discarded and no notice is sent to the framework 9. At S62, the up key timer is cancelled. At S64, the up key counter is cleared (0). At S65, the up key down is notified to the framework 9.

FIG. 8B is a flowchart of the sixth process continued from the fourth process performed using the operation input function of the mobile phone illustrated in FIG. 7.

At S66, when the down key counter is equal to or greater than n, the process proceeds to S67. When the down key counter is smaller than n, the process proceeds to S68 at which the down key event is discarded and no notice is sent to the framework 9. At S67, the down key timer is cancelled. At S69, the down key counter is cleared (0). At S70, the down key down is notified to the framework 9.

FIG. 8C is a flowchart of the seventh process continued from the fourth process performed using the operation input function of the mobile phone illustrated in FIG. 7.

At S71, when the left key counter is equal to or greater than n, the process proceeds to S72. When the left key counter is smaller than n, the process proceeds to S73 at which the left key event is discarded and no notice is sent to the framework 9. At S72, the left key timer is cancelled. At S74, the left key counter is cleared (0). At S75, the left key down is notified to the framework 9.

FIG. 8D is a flowchart of the eighth process continued from the fourth process performed using the operation input function of the mobile phone illustrated in FIG. 7.

At S76, when the right key counter is equal to or greater than n, the process proceeds to S77. When the right key counter is smaller than n, the process proceeds to S78 at which the right key event is discarded and no notice is sent to the framework 9. At S77, the right key timer is cancelled. At S79, the right key counter is cleared (0). At S80, the right key down is notified to the framework 9.

Figure 9:
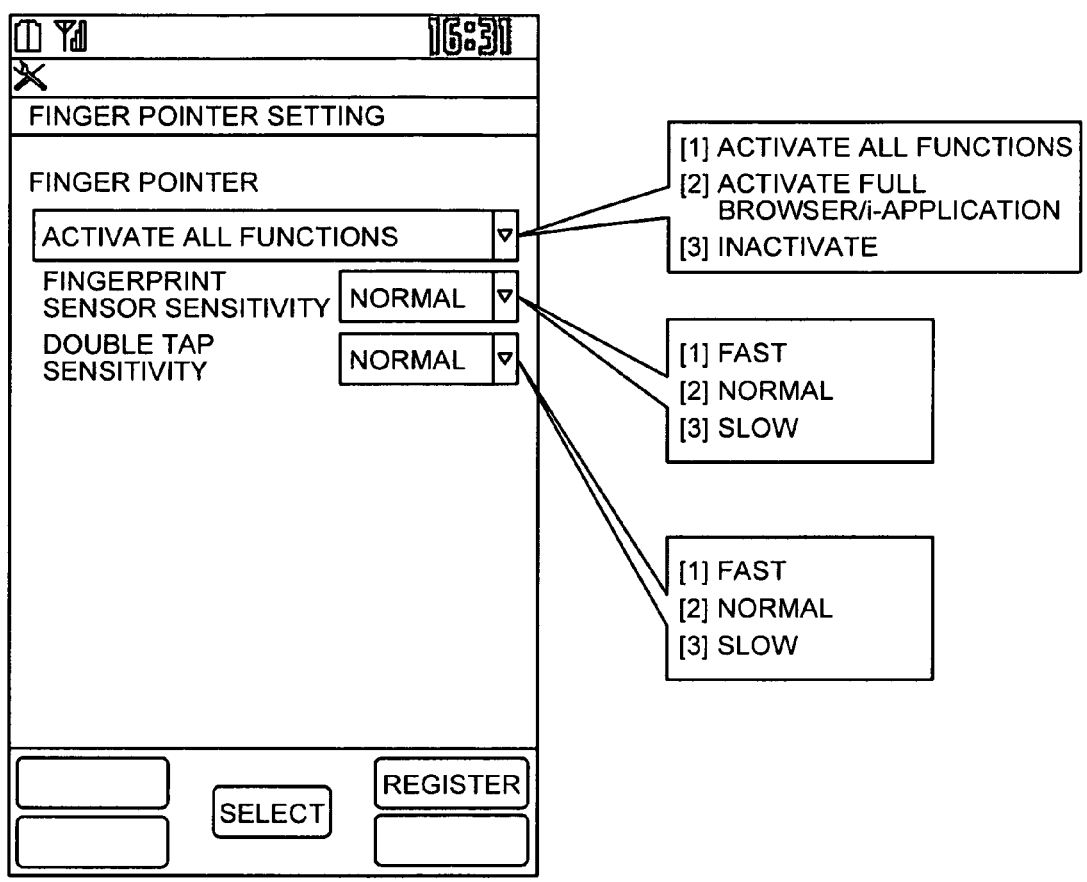
FIG. 9 is a diagram illustrating a finger pointer setting screen of the mobile phone.

FIG. 9 is a diagram illustrating the finger pointer setting screen of the mobile phone.

When any of "1" to "3" is selected by each pull-down on the finger pointer setting screen and then registration at the bottom of the screen is pressed, the setting is made.

For the finger pointer, when "1" activate all functions is selected by the pull-down, the framework 9 notifies the pointer system 11 (the pointer system application) and the key system 12 (the key system application) of an event. When "2" activate full browser/i-application is selected, the framework 9 notifies only the pointer system 11 (the pointer system application) of an event. When "3" inactivate is selected, the framework 9 does not send notices of all events.

For the fingerprint sensor sensitivity, when any of "1" fast, "2" normal, and "3" slow is selected by the pull-down, the up-down-left-right key notified by the fingerprint sensor or the amount of correction for correcting the coordinate can be selected. When the item indicating fast is selected, focusing on the list display of a menu or the like or upward, downward, leftward, and rightward movement of the pointer of the browser can be performed at increased speed just by slightly sliding a finger on the fingerprint sensor. The corrected coordinate=notified coordinate×correction value a/correction value b described at S27 in the flowchart of FIG. 4 changes depending on the setting of the fingerprint sensor sensitivity on the finger pointer setting screen. Depending on the setting of "fast", "normal", and "slow", a and b becomes "1/1", "3/2", and "4/2", i.e., 1 time, 1.5 times, and 2 times, respectively. a and b can be different values.

The key counter n described at S61, S66, S71, and S77 in the flowchart of FIG. 8 changes depending on the setting of the fingerprint sensor sensitivity on the finger pointer setting screen. Depending on the setting of "fast", "normal", and "slow", n becomes "5", "10", and "15", respectively. n can be different values for each of up, down, left, and right.

For the double tap sensitivity, when any of "1" fast, "2" normal, and "3" slow is selected by the pull-down, the time from the first right click to the second right click can be adjusted. The double tap monitor timer x described at S32 in the flowchart of FIG. 5 changes depending on the setting of the double tap sensitivity on the finger pointer setting screen. Depending on the setting of "fast", "normal", and "slow", x becomes "200 ms", "300 ms", and "400 ms", respectively.

For the application, when a map for i-application is used and a finger is moved to output the coordinate events three times while the finger is touching the fingerprint sensor, and even if a subsequent coordinate event is not output from the fingerprint sensor driver, the pointer can continuously operate by the amount of movement of the last coordinate event, i.e., the third coordinate event in this example. At this time, when the finger is released from the fingerprint sensor, the sensor touch event with no finger is notified, enabling to terminate the continuous operation of the pointer.

Although the mobile phone is explained as an example of one embodiment of the present invention, the present invention is not limited to the mobile phone and may be applied to an information processing apparatus, such as a personal computer, a PDA, or an i-PAD.

Furthermore, the present invention may be applied to an information processing apparatus that includes the fingerprint sensor, a determining unit that monitors the number of samplings as the value of operational information output from the fingerprint sensor and determines whether the number of times that an allowable value is exceeded in this range is greater than a predetermined number, and a suppression processing unit that discards, when the determining unit determines that the predetermined number is exceeded, the operational information until the operation by the fingerprint sensor is not detected.

Moreover, the present invention may be applied to a processing method implemented by the information processing apparatus including the fingerprint sensor. In the method, the number of samplings as operational information output from the fingerprint sensor is monitored, and when the number of times that an allowable value is exceeded in this range is greater than a predetermined number, the operational information is invalidated until the operation by the fingerprint sensor is not detected.

According to one aspect of the present invention, in the information processing apparatus, it is possible to prevent a malfunction due to an unintended operation, so that the operability can be improved and the comfortable usability can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    a fingerprint sensor that detects movement of a finger; and
    a transforming unit that transforms the movement of the finger detected by the fingerprint sensor into an input event corresponding to an operational instruction to an application that runs on the information processing apparatus, wherein
    when an amount of movement of the finger detected by the fingerprint sensor is greater than a threshold for the amount of movement, the transforming unit inhibits transformation of the movement of the finger detected by the fingerprint sensor into the input event and when the fingerprint sensor detects change in a moving direction of the finger and the amount of movement of the finger detected by the fingerprint sensor is greater than a second threshold for the amount of movement, the transforming unit inhibits the transformation of the movement of the finger detected by the fingerprint sensor into the input event.

2. The information processing apparatus according to claim 1, wherein
    the transforming unit counts number of times of inhibiting the transformation of the movement of the finger detected by the fingerprint sensor into the input event, and when the number of times exceeds a threshold for the number of times, the transforming unit inhibits the transformation of the movement of the finger detected by the fingerprint sensor into the input event until a predetermined operation is detected.

3. An input control method implemented by an information processing apparatus, the input control method comprising:
    detecting, by a fingerprint sensor, movement of a finger; and
    transforming the movement of the finger detected at the detecting into an input event corresponding to an operational instruction to an application that runs on the information processing apparatus, wherein
    the transforming includes, when an amount of movement of the finger detected by the fingerprint sensor is greater than a threshold for the amount of movement, inhibiting transformation of the movement of the finger detected by the fingerprint sensor into the input event and when the fingerprint sensor detects change in a moving direction of the finger and the amount of movement of the finger detected by the fingerprint sensor is greater than a second threshold for the amount of movement, inhibiting the transformation of the movement of the finger detected by the fingerprint sensor into the input event.

4. The input control method according to claim 3, wherein
    the transforming includes counting number of times of inhibiting the transformation of the movement of the finger detected by the fingerprint sensor into the input event, and when the number of times exceeds a threshold for the number of times, inhibiting the transformation of the movement of the finger detected by the fingerprint sensor into the input event until a predetermined operation is detected.

* * * * *